United States Patent
Jacobsen et al.

(12)
(10) Patent No.: US 6,235,676 B1
(45) Date of Patent: May 22, 2001

(54) PROCESS FOR THE PREPARATION OF AMMONIA AND AMMONIA SYNTHESIS CATALYST

(75) Inventors: Claus J. H. Jacobsen, Jægerspris; Michael Brorson, Charlottenlund; Jens Sehested, Copenhagen; Herman Teunissen, Hillerød; Eric O. Törnqvist, Frederiksberg, all of (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/524,313

(22) Filed: Mar. 13, 2000

(30) Foreign Application Priority Data

Mar. 15, 1999 (DK) .............................. 1999 00356

(51) Int. Cl.$^7$ .................................. B01J 27/24
(52) U.S. Cl. ...................... 502/200; 423/406; 423/409
(58) Field of Search .................... 502/200; 423/406, 423/409

(56) References Cited

U.S. PATENT DOCUMENTS

| 4,271,041 | | 6/1981 | Boudart et al. ..................... 252/438 |
| 4,337,232 | | 6/1982 | McCandlish et al. ............... 423/362 |
| 4,342,594 | * | 8/1982 | Ettmayer et al. ..................... 75/203 |
| 4,600,571 | | 7/1986 | McCarroll et al. .................. 423/363 |
| 4,701,381 | * | 10/1987 | Jack ..................................... 428/548 |
| 5,071,813 | * | 12/1991 | Kugler et al. ........................ 502/177 |
| 5,444,173 | * | 8/1995 | Oyama et al. ....................... 585/671 |

FOREIGN PATENT DOCUMENTS

| 2033776 | 5/1980 | (GB) . |
| 9168739 | 6/1997 | (JP) . |
| 9638222 | 12/1996 | (WO) . |

OTHER PUBLICATIONS

E. Keunecke–Ludwigshafen, "Der Nickel–Molybdän–Mischkatalysator Bei Der Ammoniaksynthese", vol. 36, Zeitschrift für Elektrochemie, 1930, pp. 690–692. Considered only to extent described in specification, no month.

* cited by examiner

Primary Examiner—Elizabeth D. Wood
(74) Attorney, Agent, or Firm—Ostrolenk, Faber, Gerb & Soffen, LLP

(57) ABSTRACT

Process for the preparation of ammonia from ammonia synthesis gas by contacting the synthesis gas with a bimetallic catalyst comprising a Group VIII metal combined with a Group VIB metal at conditions being effective in the formation of ammonia, wherein the bimetallic catalyst is in its nitride form during contact with the synthesis gas.

3 Claims, No Drawings

PROCESS FOR THE PREPARATION OF AMMONIA AND AMMONIA SYNTHESIS CATALYST

FIELD OF INVENTION

The present invention relates to synthesis of ammonia from ammonia synthesis gas and in particular to a catalyst being highly active in the ammonia synthesis.

DISCUSSION OF THE RELATED ART

Industrial preparation of ammonia is most usually performed by contacting hydrogen and nitrogen containing synthesis gas with catalyst at a pressure in the range of 100–400 bar and temperatures between 300° C. and 600° C. Widely used catalysts contain iron, typically promoted with oxides of aluminum and magnesium, plus oxides of calcium and potassium to increase heat resistance and synthesis activity. Furthermore, ammonia synthesis catalysts containing other Group VIII metal compounds are known in the art.

WO 96/38222 discloses a catalyst for synthesis of ammonia in presence of a catalyst comprising Group VIII metal clusters supported on basic zeolite support.

Use of ruthenium containing catalysts in the synthesis of ammonia from synthesis gas is disclosed in U.S. Pat. No. 4,600,571, JP patent publication No. 9168739 and GB patent No. 2,033,776.

Furthermore, molybdenum oxycarbonitride as active catalyst in the ammonia synthesis is mentioned in U.S. Pat. Nos. 4,271,041 and 4,337,232.

Bimetallic ammonia synthesis catalysts consisting of nickel-molybdenum are described in Z. Elektrochem. Vol. 36, Pages 690–692, 1930.

It has now been found that bimetallic catalysts comprising a combination of a Group VIII metal and a Group VIB (CAS version) metal improve activity in the synthesis of ammonia from ammonia synthesis gas, when in the nitride form.

SUMMARY OF THE INVENTION

In accordance with the above observation, this invention provides a process for the preparation of ammonia from ammonia synthesis gas by contacting the synthesis gas with a bimetallic catalyst comprising ternary compounds of a Group VIII metal and a Group VIB metal at conditions being effective in the formation of ammonia, wherein the bimetallic catalyst is in its nitride form at contact with the synthesis gas.

DETAILED DESCRIPTION OF THE PREFERRED EMBODIMENTS

When operating the inventive process the catalyst will typically be arranged in a fixed bed in an ammonia converter. The catalyst may thereby be loaded in its oxidised form which, by contact with hydrogen and nitrogen and ammonia in the reacting synthesis gas, is converted to the active nitride form according to the following reaction:

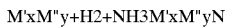

In the above general formula of the catalyst, M' represents a group VIB metal, M" a group VIII metal and x and y are mixed numbers between 1 and 10.

Still improved catalytic activity has been observed when promoting the inventive catalyst with one or more metals selected from Group IA and IIA.

At present, preferred metals for use in the above process include iron, cobalt and nickel as Group VIII metals. Molybdenum is a preferred Group VIB metal. Caesium and barium are preferred as Group IA and Group IIA promoter metals, respectively.

Suitable promoters are additionally lanthanide metals. Furthermore, the invention provides a catalyst being active in the synthesis of ammonia from ammonia synthesis gas, which catalyst is a ternary nitride having the general formula

wherein
M' represents a group VIB metal,
M" a group VIII metal and
x and y are mixed numbers between 1 and 10, the catalyst is optionally promoted with one or more metals selected from Group IA, IIA and the lanthanides.

Operation conditions of the catalyst and the above ammonia synthesis process are conventional and known to those skilled in the art.

The invention will become more apparent from the following examples explaining in more detail preparation and operation of the catalyst and ammonia synthesis process according to specific embodiments of the invention.

Example 1

Preparation of oxidic CoMo precursor.

An aqueous solution containing $Co(NO_3)_2$ (0.1 mole) is added dropwise to an aqueous solution containing 0.1 mole Mo as $(NH_4)_6Mo_7O_{24} \cdot 4H_2O$. After completion of the addition, the reaction mixture is evaporated to dryness and dried at 110° C. The product is calcined for 4 h at 600° C. under air and analysed by XRPD to be pure $CoMoO_4$.

Example 2

Preparation of oxidic NiMo precursor.

Preparation of $NiMoO_4$ according to Example 1 using $Ni(NO_3)_2$ instead of $Co(NO_3)_2$.

Example 3

Preparation of oxidic NiMo precursor.

Preparation of $Ni_2Mo_3O_{11}$, according to Example 2 using 0.066 mole $Ni(NO_3)_2$ instead of 0.1 mole $Ni(NO_3)_2$.

Example 4

Preparation of oxidic CoMo precursor.

Preparation of $Co_4MoO_7$ according to Example 1 using 0.4 mole $Co(NO_3)_2$ instead of 0.1 mole $Co(NO_3)_2$.

Example 5

Preparation of oxidic FeMo precursor.

Preparation of $Fe_2Mo_3O_{12}$ according to Example 3 using 0.066 mole $Fe(NO_3)_3$ instead of 0.066 mole $Ni(NO_3)_2$.

Example 6

Preparation of oxidic NiW precursor.

Preparation of $NiWO_4$ according to Example 2 using 0.1 mole W as $(NH_4)_{10}[H_2W_{12}O_{40}] \cdot 7H_2O$ instead of 0.1 mole Mo as $(NH_4)_6Mo_7O_{24} \cdot 4H_2O$.

Example 7

Preparation of Cs promoted oxidic CoMo precursor.

Preparation of $Co_{0.95}Cs_{0.10}MoO_4$ according to Example 1 using 0.095 mole $Co(NO_3)_2$ and 0.010 mole $CsNO_3$ instead of 0.10 mole $Co(NO_3)_2$.

Example 8

Preparation of barium promoted oxidic CoMo precursor.

Preparation of $Co_{0.90}Ba_{0.10}MoO_4$ according to Example 1 using 0.09 mole $Co(NO_3)_2$ and 0.010 mole $Ba(NO_3)_2$ instead of 0.10 mole $Co(NO_3)_2$.

Example 9

Preparation of lanthanum promoted oxidic NiMo precursor.

Preparation of $Ni_{0.85}La_{0.05}MoO_4$ according to Example 1 using 0.085 mole $Ni(NO_3)_2$ and 0.005 mole $La(NO_3)_3$ instead of 0.10 mole $Co(NO_3)_2$.

Example 10

Nitridation of oxidic CoMo precursor in pure ammonia.

$CoMoO_4$ from Example 1 is pressed into pellets, crushed and sieved to a particle size of 0.3–0.8 mm 5.0 g of material and placed in the reactor described in A. Nielsen: An Investigation on Promoted Iron Catalysts for the Synthesis of Ammonia, Gjellerup 1968. The catalyst is heated in a 50 l/h stream of gaseous ammonia at 0.1° C./min to 650° C. It is kept at 650° C. for 24 h and cooled to room-temperature.

Example 11

Nitridation of oxidic CoMo precursor in diluted ammonia.

This experiment is conducted as in the above experiment 10 except that the nitridation is performed in a 50 l/h flow of 4.5% ammonia in 71.6% hydrogen and 23.9% nitrogen.

Example 12

Nitridation of oxidic NiMo precursor in diluted ammonia.

This experiment is conducted as Example 11 except that 3.1 g of $NiMoO_4$ from Example 2 is used as in a starting material.

Example 13

Nitridation of non-oxidic CoMo precursor in diluted ammonia.

This experiment is conducted as in Example 11 except that 4.3 g of $Co(NH_3)_6Mo(CN)_8$ is used as a starting material.

Example 14

Promotion of CoMo nitride catalyst with Cs.

Two and one-half grams of product from Example 10 is impregnated to incipient wetness with a solution of $CsNO_3$ in water. The resulting product is dried at 110° C. and contains 6.2% Cs as found by chemical analysis.

Example 15

Promotion of NiMo nitride catalyst with Ba.

One and two-fifths gram of product from Example 12 is impregnated to incipient wetness with an aqueous solution of $Ba(OH)_2$. The product obtained after drying at 110° C. is found by chemical analysis to contain 5.4% Ba.

Example 16

Supported oxidic CoMo catalyst.

A spinel carrier $MgO \cdot xAl_2O_3$, wherein the spinel has a specific surface area $A_{sp}[m^2/g]$ higher than $400 \cdot exp(-Tc/400° C.)$ obtained by calcination at a temperature Tc [° C.], disclosed in U.S. patent application Ser. No. 09/467,242 filed on Dec. 22, 1998, was calcined at 700° C. and impregnated to contain 10.5 wt % Co and 16.2% Mo after calcination at 500° C. The impregnation was conducted by multiple incipient wetness impregnations with $Co(NO_3)_2 \cdot 6H_2O$ and $(NH_4)_6Mo_7O_{24} \cdot 4H_2O$.

Example 17

Supported Cs promoted CoMo catalyst.

The impregnation was conducted as in Example 16 except that a final impregnation with aqueous CsOH was performed to obtain 4.1% Cs on the catalyst precursor.

Example 18

Testing of catalytic ammonia synthesis activity.

The testing was performed in the equipment used for the nitridation studies mentioned in Example 10. In all test experiments, between 3–8 g of catalyst was loaded into the reactor. All catalysts were nitrided using the procedures of Example 10-12 prior to testing. The catalysts were tested at 400° C. and 100 bar total pressure. The inlet gas contained 4.5% ammonia in a 3:1 hydrogen-nitrogen mixture. The flow rate was adjusted to obtain 12% ammonia in the exit. Typical flow rates were between 2000 ml/h and 50 l/h.

| Catalyst[1] | [2]Ammonia Production Nml/h · g |
|---|---|
| CoMo according to Ex. 1 and 10 | 120 |
| CoMo according to Ex. 1 and 11 | 210 |
| CoMo according to Ex. 13 | 120 |
| CsCoMo according to Ex. 7 and 11 | 650 |
| CsCoMo according to Ex. 14 | 680 |
| Ba/CoMo according to Ex. 8 and 11 | 520 |
| NiMo according to Ex. 2 and 12 | 80 |
| La/NiMo according to Ex. 9 and 10 | 310 |
| FeMo according to Ex. 5 and 10 | 85 |
| Cs/FeMo according to Ex. 5, 14 and 10 | 540 |
| NiW according to Ex. 6 and 11 | 50 |
| $CoMo/MgAl_2O_4$ according to Ex. 16 and 11 | 70 |
| $CsCoMo/MgAl_2O_4$ according to Ex. 17 and 11 | 210 |

[1]The examples refer to the method of the precursor preparation and the activation procedure, respectively.
[2]The activity is based on the mass of catalyst loaded into the reactor.

Example 19

The testing was performed as in Example 18, but with a 4.5% ammonia in a 1:1 hydrogen-nitrogen mixture.

| Catalyst[1] | [2]Ammonia Production Nml/g · h |
|---|---|
| CoMo according to Ex. 1 and 10 | 230 |
| Cs/CoMo according to Ex. 7 and 11 | 1040 |

[1]The examples refer to the method of the precursor preparation and the activation procedure, respectively.
[2]The activity is based on the mass of catalyst loaded into the reactor.

Comparison Example 20

High surface area molybdenum nitride $MO_2N$ was prepared according to Boudart et al. (Stud. Surf. Sci. Catal. Vol 16 page 147) resulting in a surface area of 130 $m_2/g$. A test of this catalyst by a procedure as described in the above Example 18 revealed an ammonia production activity of 20 Nml/g·h.

What is claimed is:

1. Catalyst being active in the synthesis of ammonia from ammonia synthesis gas being in form of a ternary nitride and having the general formula:

$$M'xM"yN,$$

wherein M' represents a Group VIB metal, M" a Group VIII metal and x and y each are a mixed number between 1 and 10 and including a promoter selected from Group IA and Group IIA metals.

2. Catalyst according to claim 1, wherein the Group IA metal is caesium and the group IIA metal is barium.

3. Catalyst being active in the synthesis of ammonia from ammonia synthesis gas being in form of a ternary nitride and having the general formula:

$$M'xM"yN,$$

wherein M' represents a Group VIB metal, M" a Group VIII metal and x and y each are a mixed number between 1 and 10 and including a promoter selected from lanthanide metals.

* * * * *